(12) United States Patent
Takahashi

(10) Patent No.: US 8,395,799 B2
(45) Date of Patent: Mar. 12, 2013

(54) PRINTING SYSTEM, OUTPUT DEVICE, DATA MANAGEMENT SYSTEM, CONTROL METHOD, AND PROGRAM

(75) Inventor: Takeshi Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 193 days.

(21) Appl. No.: 13/059,060

(22) PCT Filed: Dec. 1, 2010

(86) PCT No.: PCT/JP2010/071946
§ 371 (c)(1),
(2), (4) Date: Feb. 14, 2011

(87) PCT Pub. No.: WO2011/080995
PCT Pub. Date: Jul. 7, 2011

(65) Prior Publication Data
US 2011/0242593 A1 Oct. 6, 2011

(30) Foreign Application Priority Data
Dec. 28, 2009 (JP) .................................. 2009-298827

(51) Int. Cl.
G06F 3/12 (2006.01)
G06F 15/16 (2006.01)
G06F 15/167 (2006.01)
G06F 15/173 (2006.01)
G06K 15/00 (2006.01)

(52) U.S. Cl. ...................... 358/1.15; 358/1.13; 358/1.14; 358/1.16; 709/202; 709/203; 709/216; 709/224; 709/231

(58) Field of Classification Search .................. None
See application file for complete search history.

(56) References Cited

U.S. PATENT DOCUMENTS 7,711,752 B2   5/2010   Takahashi
(Continued)

FOREIGN PATENT DOCUMENTS

EP    1276041 A2    1/2003
JP    2002251356 A  9/2002
(Continued)

OTHER PUBLICATIONS

PCT International Search Report in corresponding International Application No. PCT/JP2010/071946, dated Jan. 18, 2011.

(Continued)

*Primary Examiner* — Benny Q Tieu
*Assistant Examiner* — Haris Sabah
(74) *Attorney, Agent, or Firm* — Fitzpatrick, Cella, Harper & Scinto

(57) ABSTRACT

A data management system that is connected to a client terminal and an output device, comprises a request search means configured to search for a print target data request corresponding to a print ticket attached to a print request from the client terminal from among print target data requests with respect to which a response has been deferred; a corresponding document designation means configured to, in the case where the access right determination means performs access right determination with respect to data designated by the print request and determines that access is permitted, designate the data designated by the print request as print target data requested by the corresponding print target data request; and a sending means configured to send the print target data designated by the corresponding document designation means to the output device as the response to the print target data request.

6 Claims, 15 Drawing Sheets

U.S. PATENT DOCUMENTS

| | | | |
|---|---|---|---|
| 2002/0120875 A1 | 8/2002 | Kiwada et al. | |
| 2003/0007175 A1 | 1/2003 | Tsuda et al. | |
| 2007/0013945 A1* | 1/2007 | Yoshida et al. | 358/1.15 |
| 2007/0216935 A1 | 9/2007 | Osamura et al. | |
| 2007/0273924 A1 | 11/2007 | Ozawa | |
| 2007/0279685 A1 | 12/2007 | Tsuda et al. | |

FOREIGN PATENT DOCUMENTS

| | | |
|---|---|---|
| JP | 2003022165 A | 1/2003 |
| JP | 2003345579 A | 12/2003 |
| JP | 2007245627 A | 9/2007 |
| JP | 2008001089 A | 1/2008 |
| JP | 2008129812 A | 6/2008 |

OTHER PUBLICATIONS

Written Opinion of the International Searching Authority in corresponding International Application No. PCT/JP/2010/071946, dated Jan. 18, 2011.

* cited by examiner

FIG. 8

```
<Settings>
  <Print>
      <PaperSize value="A4">
        <value>A4</value>
        <value>A3</value>
        <value>B5</value>
      </PaperSize>
      <NumberOfPageOnPaper value=2>
        <value>1</value>
        <value>2</value>
        <value>4</value>
        <value>8</value>
      </NumberOfPageOnPaper>
      <ColorMode value="Color">
        <value>Color</value>
        <value>Black & White</value>
      </ColorMode>
  </Print>
</Settings>
```

FIG. 9A

| UserID | Name | Password |
|---|---|---|
| 1 | Admin | *** |
| 2 | User1 | *** |
| 3 | User2 | *** |

FIG. 9B

| DocID | Name | URI | Data |
|---|---|---|---|
| 1 | Doc1 | http://www… | xxx… |
| 2 | Doc2 | http://www… | xxx… |
| 3 | Doc3 | http://www… | xxx… |

FIG. 9C

| DocID | UserID | Rights |
|---|---|---|
| 1 | 1 | RW |
| 2 | 1 | RW |
| 3 | 1 | RW |
| 1 | 2 | R |
| 2 | 2 | R |
| 3 | 2 | R |
| 1 | 3 | RW |
| 2 | 3 | R |
| 3 | 3 | R |

FIG. 9D

| TicketID | RequestData | DocURI |
|---|---|---|
| 1 | xxx… | null |
| 2 | xxx… | null |

FIG. 9E

| TicketID | TicketData |
|---|---|
| 1 | JXFQW-WMRVW-32642-xxxx-R8621 |
| 2 | JXFQW-WMRVW-32642-xxxx-R8622 |

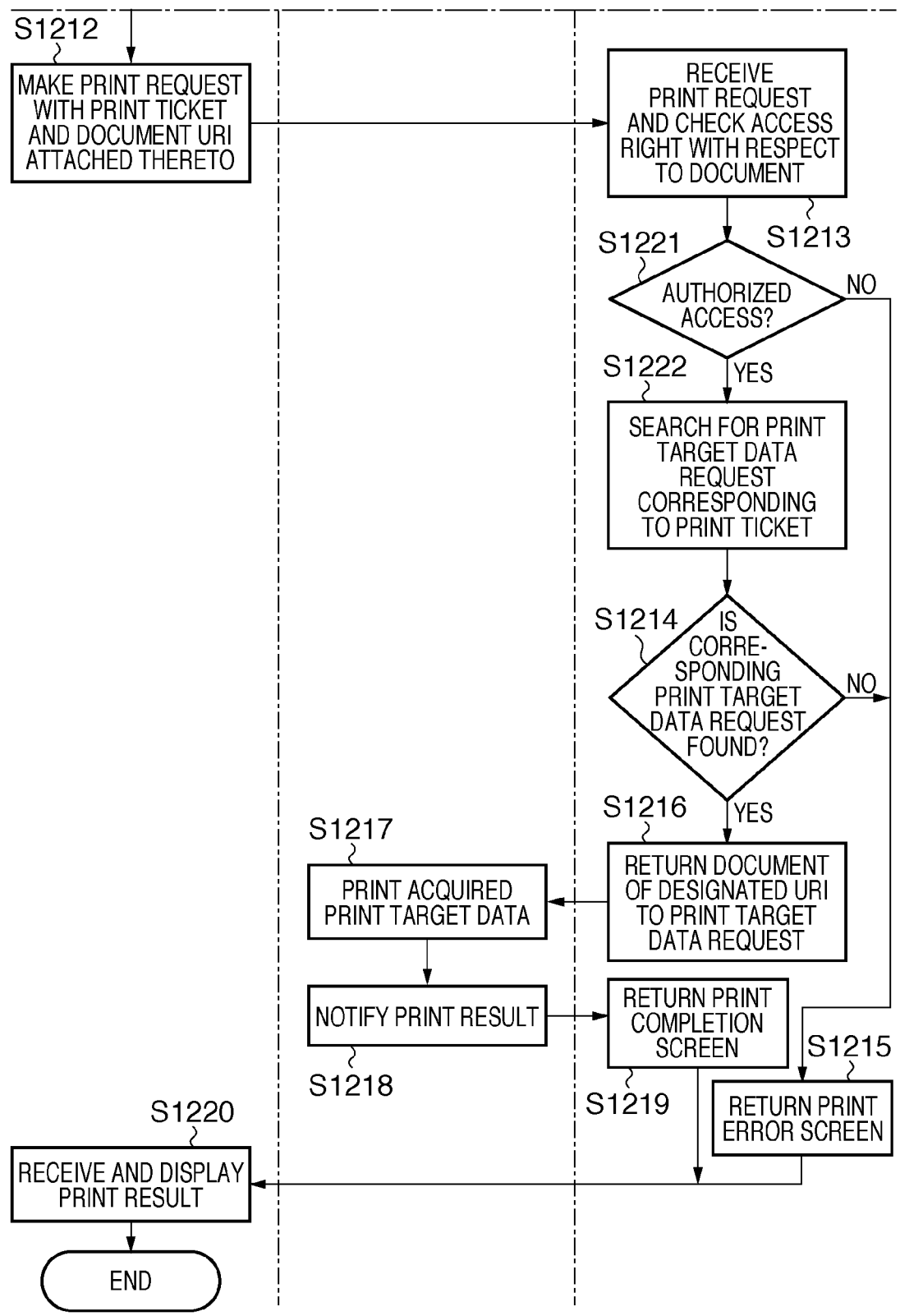
F I G. 10B

PRINTING SYSTEM, OUTPUT DEVICE, DATA MANAGEMENT SYSTEM, CONTROL METHOD, AND PROGRAM

TECHNICAL FIELD

The present invention relates to a printing system for outputting data that is managed by a server service outside a firewall on an output device inside the firewall.

BACKGROUND ART

In recent years, as more and more offices have become networked, it has become common that an output device also is connected to the network in an office and executes output processing such as printing or faxing over the network based on an output instruction from any terminal within the office.

Moreover, against the background of the increasing speed of networks, an expanded range of Internet services, and the like, there is increasing drive to build a server (hereinafter a data management system) that keeps and manages data such as a document on the Internet.

On the other hand, there is a tendency that as few applications as possible are desired to be installed on the PC terminals in an office in light of maintenance, security, and the like, and so there is a demand for a system that can accomplish an intended task using only a general-purpose Web browser.

In this context, the problem is a method for printing data that is managed by a server on the Internet on an output device in an intranet that is located inside a firewall when operation is performed from a Web browser of a PC terminal.

Without the firewall, printing is possible by sending print data from the data management system to the output device. However, the firewall restricts data from being sent from the server on the Internet to the output device on the intranet.

Thus, a mechanism referred to as "URL printing" as also described in Japanese Patent Laid-Open No. 2003-345579 has been contrived as the method for outputting an image located on a Web server on the Internet using an output device that is present on an intranet. In this method, first, a URL that indicates the target image located on the Web server is checked and passed to the output device. Although there are various methods for passing the URL to the output device, an example is a method that uses an infrared communication function incorporated in a terminal such as a mobile phone and sends the URL of the image to the output device that also has an infrared communication function. The output device that has been given the URL accesses the Web server based on the given URL and executes downloading of the target image and output processing of that image. In this case, since the server on the Internet is accessed from the output device side, the output device can acquire the target image without being blocked by the firewall.

The above-described "URL printing" usually applies to an image or a Web page that is open to the public, and therefore, anyone can perform printing as long as they know the target URL. However, when the print target is business data, there is a problem of security if anyone can perform printing by simply knowing the URL. Usually, however, user authentication is required in order to acquire data from the data management system, and data cannot be acquired or printed unless a correct password and user ID are presented.

Thus, a method can be considered in which as shown in FIG. 2, a username and password together with a target URL are passed to an output device from a PC terminal, the output device performs user authentication for the data management system, and thereby the output device acquires print target data. However, user management is not performed in the output device, or even if user management is performed, user management is usually performed separately in the output device and the data management system on the Internet. That is to say, passing the password of the data management system to the output device even though the password of the data management system is not "information that is necessary in order to use the output device" involves a significant security risk and can be said to be a problem. For example, assuming that a program that operates the output device is malicious or vulnerable, passing the password of the data management system to the output device involves a risk of leakage of confidential information, that is, the password of the data management system.

SUMMARY OF INVENTION

The problem to be solved by the invention is to securely realize a function of printing data that is protected and managed by a data management system on the Internet on an output device inside an intranet by performing an operation from a Web browser. "Securely" as used herein means that the function can be realized without diminishing the security of the data to be printed and without risking leakage of, for example, a password to access the data management system.

According to one aspect of the present invention, there is provided a printing system comprising a client terminal, a data management system, and an output device, which can communicate with one another when communication is initiated by the client terminal or the output device, the output device comprising: a ticket issuing means configured to issue a print ticket associated with a print instruction; a print target data request control means configured to make a print target data request with the print ticket attached thereto to the data management system; and an output means configured to output print target data acquired from the data management system as a response to the print target data request, and the data management system comprising: a data storage means configured to keep data; a script generation means configured to generate a script to be executed by the client terminal to allow a user to input the print instruction; a request management means configured to accept the print target data request from the output device, temporally to defer the response to the print target data request, and to perform control so that the response to the print target data request is made after print target data designation; a user authentication means configured to specify the user; an access right determination means configured to determine an access right of the user with respect to the kept data; a request search means configured to search for a print target data request corresponding to the print ticket attached to a print request from the client terminal from among print target data requests with respect to which a response has been deferred; a corresponding document designation means configured to, in the case where the access right determination means performs access right determination with respect to data designated by the print request and determines that access is permitted, designate the data designated by the print request as print target data requested by the corresponding print target data request; and a sending means configured to send the print target data designated by the corresponding document designation means to the output device as the response to the print target data request, wherein the script generated by the data management system is executed by the client terminal and sends the print instruction to an output device designated by the user, and sends the print ticket issued by the output device together with information indicating data to be printed to the data management system as the print request.

According to another aspect of the present invention, there is provided an output device that is connected to a client terminal and a data management system, comprising: a ticket issuing means configured to issue a print ticket associated with a print instruction; a print target data request control means configured to make a print target data request with the print ticket attached thereto to the data management system; and an output means configured to output print target data acquired from the data management system.

According to another aspect of the present invention, there is provided a data management system that is connected to a client terminal and an output device, comprising: a data storage means configured to keep data; a script generation means configured to generate a script to be executed by the client terminal to allow a user to input a print instruction; a request management means configured to accept a print target data request from the output device, temporally to defer a response to the print target data request, and to perform control so that the response to the print target data request is made after print target data designation; a user authentication means configured to specify the user; an access right determination means configured to determine an access right of the user with respect to the kept data; a request search means configured to search for a print target data request corresponding to a print ticket attached to a print request from the client terminal from among print target data requests with respect to which a response has been deferred; a corresponding document designation means configured to, in the case where the access right determination means performs access right determination with respect to data designated by the print request and determines that access is permitted, designate the data designated by the print request as print target data requested by the corresponding print target data request; and a sending means configured to send the print target data designated by the corresponding document designation means to the output device as the response to the print target data request.

According to another aspect of the present invention, there is provided a method for controlling a printing system comprising a client terminal, a data management system, and an output device, which can communicate with one another when communication is initiated by the client terminal or the output device, the method comprising the steps of: in the output device, a ticket issuing means configured to issue a print ticket associated with a print instruction; a print target data request control means configured to make a print target data request with the print ticket attached thereto to the data management system; and an output means configured to output print target data acquired from the data management system as a response to the print target data request, and in the data management system, a data storage means configured to keep data; a script generation means configured to generate a script to be executed by the client terminal to allow a user to input the print instruction; a request management means configured to accept the print target data request from the output device, temporally to defer the response to the print target data request, and to perform control so that the response to the print target data request is made after print target data designation; a user authentication means configured to specify the user; an access right determination means configured to determine an access right of the user with respect to the kept data; a request search means configured to search for a print target data request corresponding to the print ticket attached to a print request from the client terminal from among print target data requests with respect to which a response has been deferred; a corresponding document designation means configured to, in the case where access right determination with respect to data designated by the print request is performed in the access right determination step and it is determined that access is permitted, designate the data designated by the print request as print target data requested by the corresponding print target data request; and a sending means configured to send the print target data designated in the corresponding document designation step to the output device as the response to the print target data request, wherein the script generated by the data management system is executed by the client terminal and sends the print instruction to an output device designated by the user, and sends the print ticket issued by the output device together with information indicating data to be printed to the data management system as the print request.

It is possible to securely realize a function of printing data that is protected and managed by a data management system on the Internet on an output device in an intranet by performing operation from a Web browser.

Further features of the present invention will become apparent from the following description of exemplary embodiments with reference to the attached drawings.

BRIEF DESCRIPTION OF DRAWINGS

FIG. 8 is a diagram showing an example of a print setting information data structure according to the embodiment.

FIGS. 9A, 9B, 9C, 9D, and 9E are tables showing examples of a data structure according to the embodiment.

FIGS. 10A and 10B are flowcharts according to a first embodiment.

DESCRIPTION OF EMBODIMENTS

Hereinafter, embodiments for carrying out the present invention will be described using the drawings.

System Configuration

Figure 1:
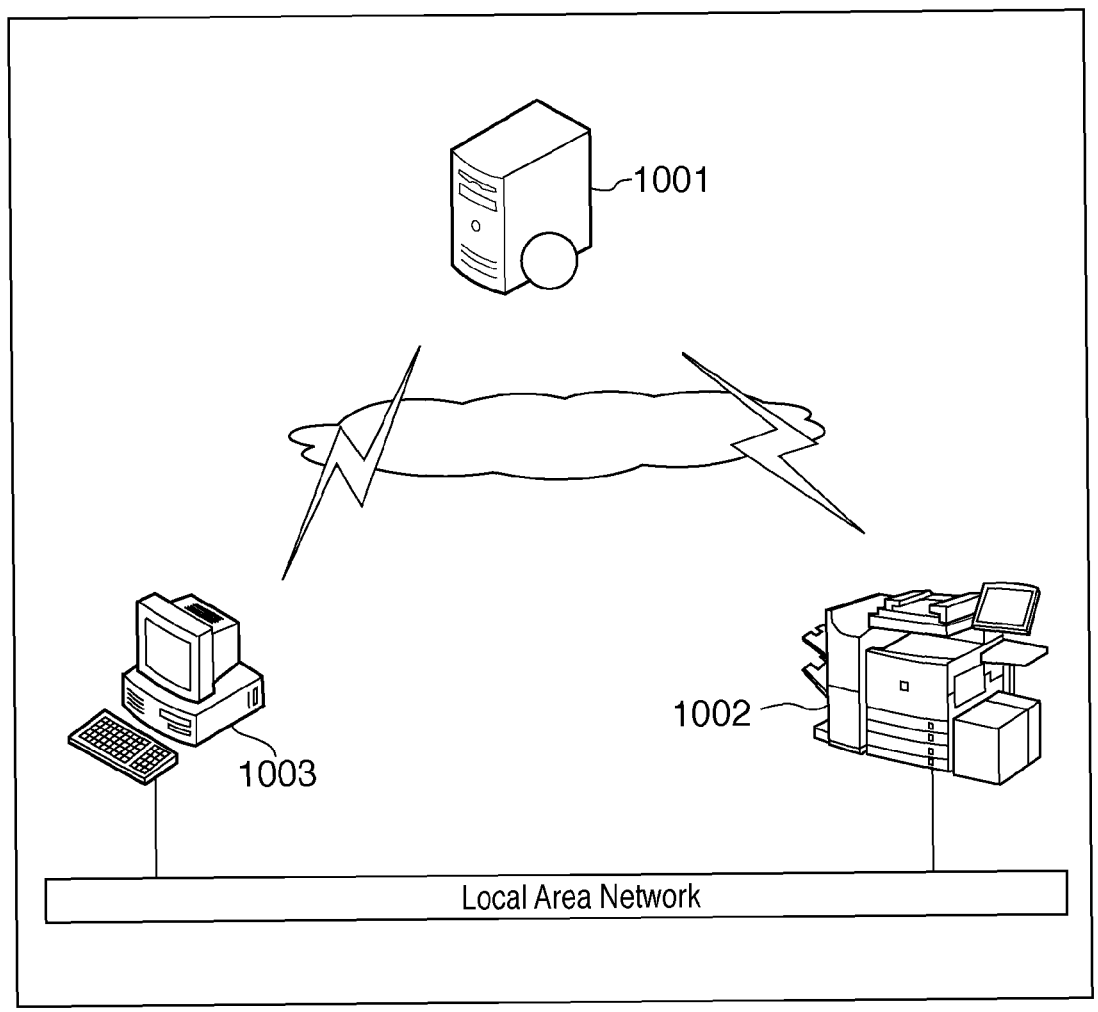
FIG. 1 is a diagram showing an example of a basic system configuration according to an embodiment of the present invention.
Figure 2:
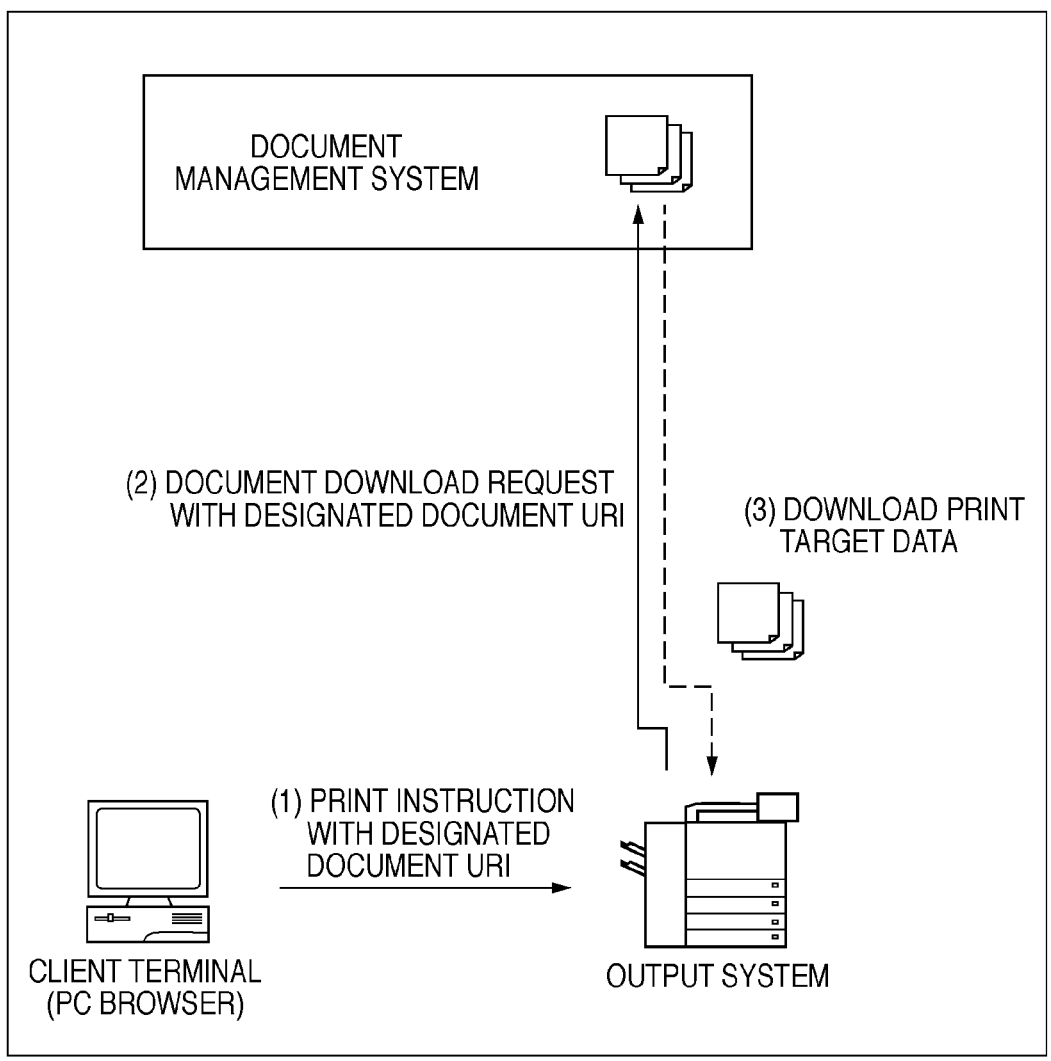
FIG. 2 is a diagram for explaining the problem according to the embodiment.

FIG. 1 is a conceptual system diagram of a printing system according to an embodiment of the present invention. A document management system 1001 is a Web server serving as a data management system having the functions of keeping and managing a document, and is assumed to be built on the Internet and accessible from an ordinary office. Although document data is described as data handled herein, this is not a limitation, and other types of data such as image data may also be used. Moreover, the term "document" as described hereinbelow is intended to include the document data itself and accompanying information. An output device 1002 has a function of outputting data received in a predetermined format by executing printing, facsimile transfer, mail transfer, or the like in accordance with designated settings, and also has a function of detecting the paper supply status of the output device itself or the installation status of a finisher device and determining the current capabilities and state. Furthermore, the output device 1002 has a communication function of being able to connect to a Web server or the like and also has a function of receiving a request from an external Web browser or the like. Moreover, the present invention is applicable to cloud computing.

A client terminal 1003 is a PC with a general-purpose Web browser installed thereon, the Web browser communicating with a Web server on the Internet and being capable of the drawing of HTML delivered from the Web server, execution of scripts such as JavaScript (registered trademark), and the like. The printing system according to the present embodiment is operated by a user using the general-purpose Web browser of this terminal. The output device 1002 and the client terminal 1003 are located inside a local area network (hereinafter a network) in an office, and a controlled environment is created in which access from an external network such as the Internet is restricted. That is to say, access from the document management system 1001 to both the output device 1002 and the client terminal 1003 is restricted. Of course, access from the network side to the Internet is possible, and the output device 1002 and the client terminal 1003 can initiate communication with the document management system 1001.

Hardware Configuration

Figure 3:
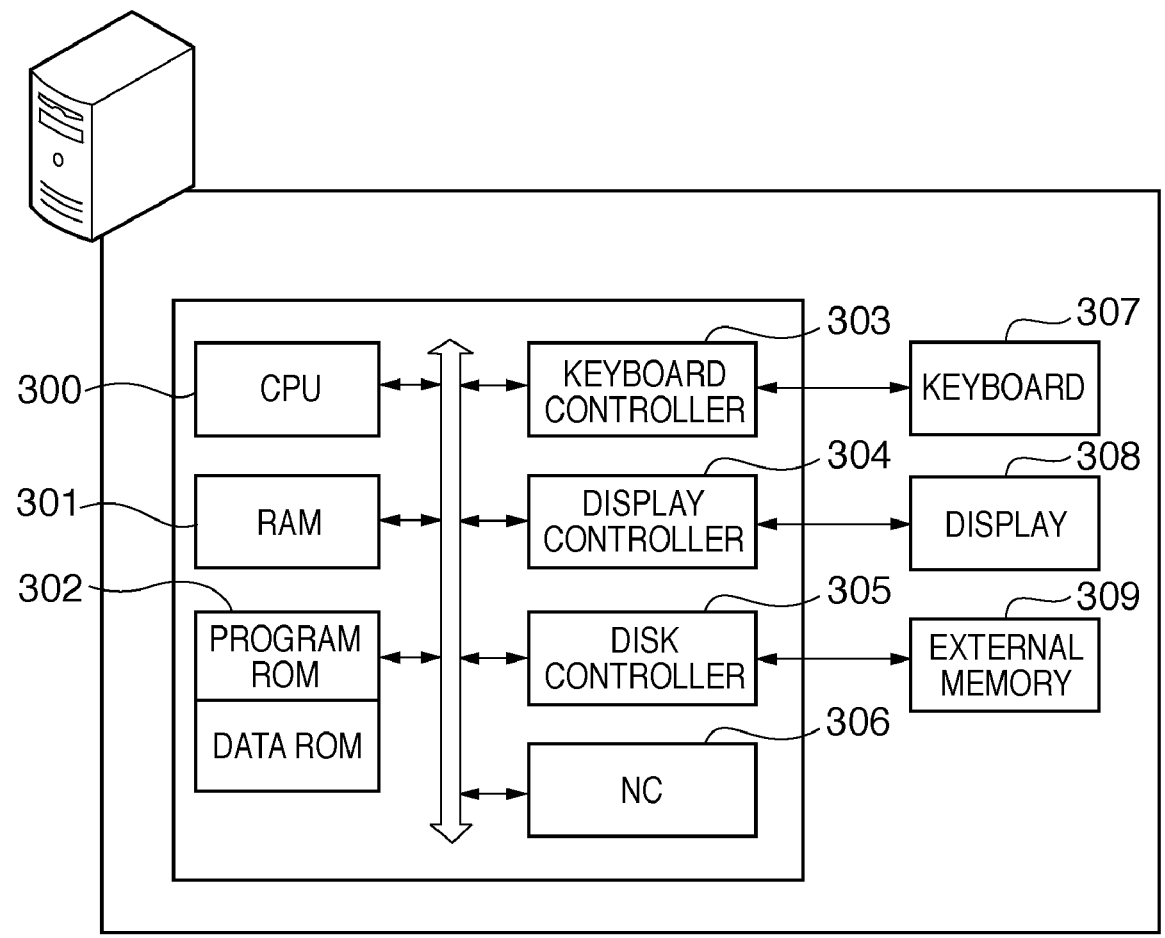
FIG. 3 is a diagram showing an example of a hardware configuration of a client terminal according to the embodiment.
Figure 4:
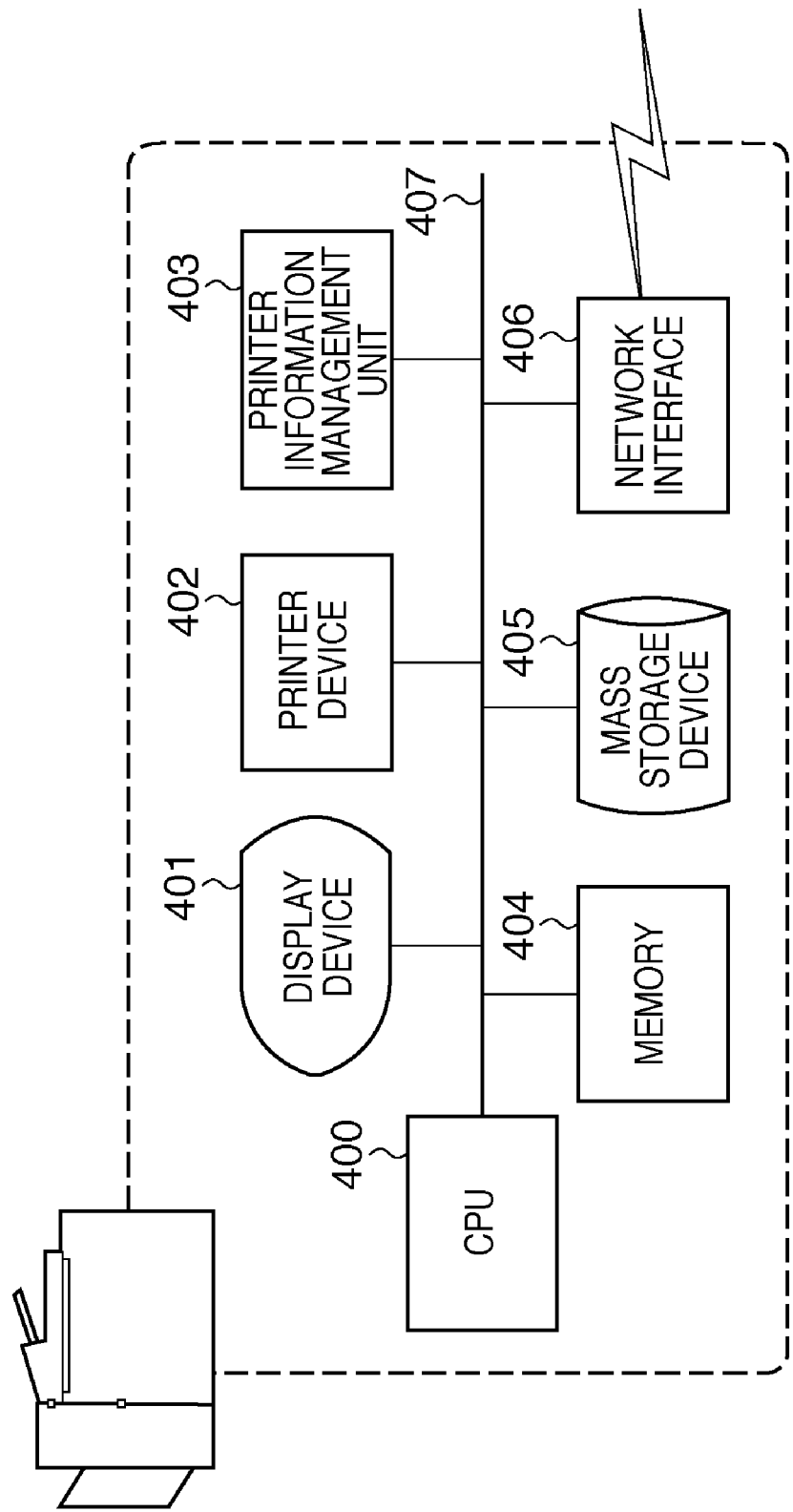
FIG. 4 is a diagram showing an example of a hardware configuration of an output device according to the embodiment.

FIG. 3 is a hardware configuration diagram of a PC that configures the document management system 1001 and the client terminal 1003 according to the embodiment of the present invention. FIG. 4 is a hardware configuration diagram of the output device 1002 according to the embodiment of the present invention. It is assumed that the hardware configuration diagrams shown in FIGS. 3 and 4 correspond to hardware configuration diagrams of common information processing apparatuses and output devices, and a hardware configuration of a common information processing apparatus can be applied to each PC/output device of the present embodiment.

In FIG. 3, a CPU 300 executes a program, such as an OS or an application, stored in a program ROM of a ROM 302 or loaded into a RAM 301 from an external memory 309. The term "OS" is an abbreviation for an "operating system" that runs on a computer. Hereinafter, an operating system will be referred to as an OS. Processing of each flowchart that will be described later can be realized by the execution of a program. The RAM 301 functions as a main memory, a work area, or the like of the CPU 300. A keyboard controller 303 controls key input from a keyboard 307 or a pointing device (not shown). A display controller 304 controls display on various types of displays 308. A disk controller 305 controls access to data in a hard disk (HD) 309, a floppy (registered trademark) disk (FD), or the like that stores various types of data. An NC 306 is connected to a network and executes processing for controlling communication with other devices connected to the network.

In FIG. 4, a CPU 400 connects various functions/devices (described later) to each other via an internal bus 407 and controls the output device 1002. A display device 401 is a device, such as a touch panel, for displaying a screen. The user performs, for example, an operation for causing the output device to operate as desired by the user through a screen that is displayed on the display device 401. A printer device 402 is a device for performing printing, and a printer information management unit 403 manages/holds information about the functions/state of the printer device 402.

Furthermore, a memory 404 stores various types of commands (including an application program) to be executed by the CPU 400 in order to control the output device 1002. A mass storage device 405 temporally stores data to be printed on the printer device 402. Moreover, a network interface 406 sends and receives signals via the network as directed by the CPU 400.

Software Configuration

Figure 5:
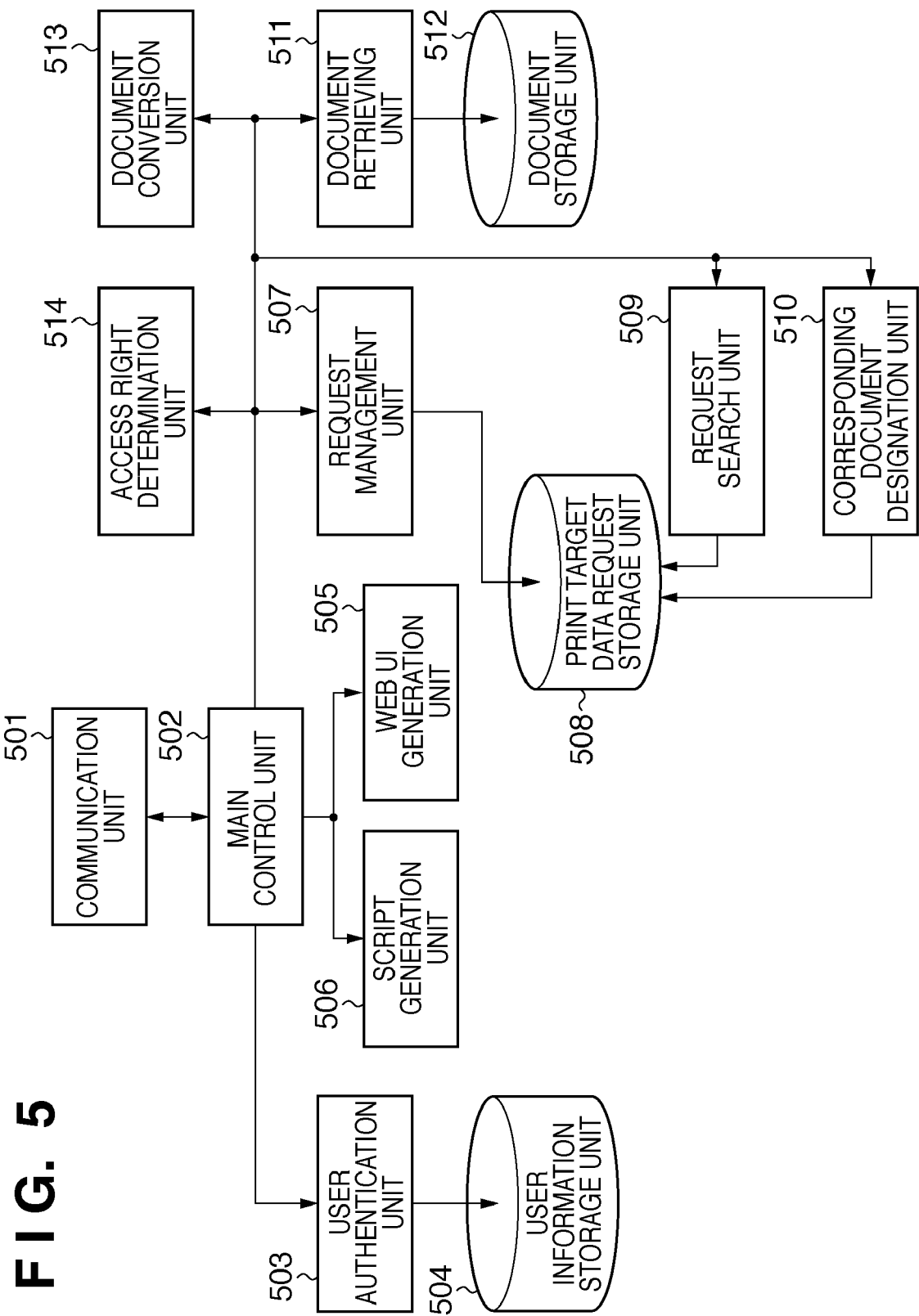
FIG. 5 is a diagram showing an example of a software configuration of a document management system according to the embodiment.

FIG. 5 is a diagram showing an example of a software configuration of the document management system 1001 according to the embodiment of the present invention. Components illustrated as rectangles in FIG. 5 individually represent program components to be loaded from the external memory 309 or the program ROM 302 into the RAM 301 and executed by the CPU 300. Moreover, each part illustrated as a column shape represents a data set saved and stored in the external memory 309, the RAM 301, the data ROM 302, or the like. The components and the data sets are merely illustrated as being logically divided and are not necessarily divided physically.

A communication unit 501 is a component having the functions of receiving request information that has been transmitted via the Internet and passing the request information to a main control unit 502, and also receiving response information corresponding to the request from the main control unit 502 and sending the response information to the source of the request. Exchange of the request information and response information is basically performed by communication based on the HTTP or HTTPS protocol.

The main control unit 502 has the functions of interpreting the request that has been received through the communication unit 501, calling an appropriate component, and passing the request data to the component to allow the component to execute processing. Moreover, the main control unit 502 mediates processing executed by components, generates response data for returning the result of processing executed by the components to the source of the request, and returns the response data to the communication unit 501. A user authentication unit 503 has the functions of extracting authentication data added to the request, comparing the authentication data with information stored in a user information storage unit 504, and thereby specifying the user who has executed the request. The user information storage unit 504 stores and manages information about users as shown in FIG. 9A in the external memory 309 or the RAM 301.

A Web UI generation unit 505 receives an instruction from the main control unit 502 and generates a Web UI (HTML) appropriate for the situation. A script generation unit 506 generates a script such as a JavaScript (registered trademark) as instructed by the main control unit 502. A request management unit 507 receives an instruction from the main control unit 502 and, in accordance with the instruction, stores request information of a "print target data request (described later)" that has been received by the communication unit 501 in a print target data request storage unit 508. Furthermore, the request management unit 507, in response to an instruction from the main control unit 502, also updates print setting information (described later) that is part of the request information of the print target data request stored in the print target data request storage unit 508. Once print target data corresponding to this "print target data request" has been designated, the request management unit 507 requests the main control unit 502 to return the designated print target data to the source of the request and deletes the request information of the target from the print target data request storage unit 508. However, in the case where the print target data is not designated during a predetermined period of time, the request management unit 507 deletes the request information from the print target data request storage unit 508 and requests the main control unit 502 to return a timeout error to the source of this "print target data request".

The print target data request storage unit 508 stores information about print target data requests as shown in FIGS. 9D and 9E in the external memory 309 or the RAM 301. A request search unit 509 that performs management searches for request information of a "print target data request" associated with the same print ticket as that designated by the main control unit 502 from the print target data request storage unit 508 and returns the request information to the main control unit 502. The print ticket will be described later. However, in the present embodiment, the print ticket refers to a globally unique character string, numerical value, or file that, each time a print instruction is given from the client terminal 1003, enables the output device 1002 to specify the issued print instruction. In the case where the designated print ticket is not found in the print target data request storage unit 508, the request search unit 509 requests the main control unit 502 to return an error that a corresponding resource is not found to the source of the request.

A corresponding document designation unit 510 associates, based on an instruction from the main control unit 502, the "print target data request" associated with the designated print ticket with a document that likewise has been designated by the main control unit 502. A document retrieving unit 511, in response to an instruction from the main control unit 502, retrieves a document stored in a document storage unit 512 and passes the retrieved document to the main control unit 502. A document in the document storage unit 512 is assigned a unique identifier (this identifier may be a character string or may be a number), that is, a URI, for management. In an instruction from the main control unit 502, the document is designated using the URI. The document storage unit 512 is a portion in which a document is stored and held, and stores and manages document data and accompanying information as shown in FIGS. 9B and 9C in the external memory 309 or the RAM 301. A data storage unit is thus realized.

A document conversion unit 513 performs file format conversion on document data based on an instruction from the main control unit 502. An access right determination unit 514 determines whether a designated user has the authority to read the target document or has the authority to write to the target document based on access control information stored in the document storage unit 512.

Figure 6:
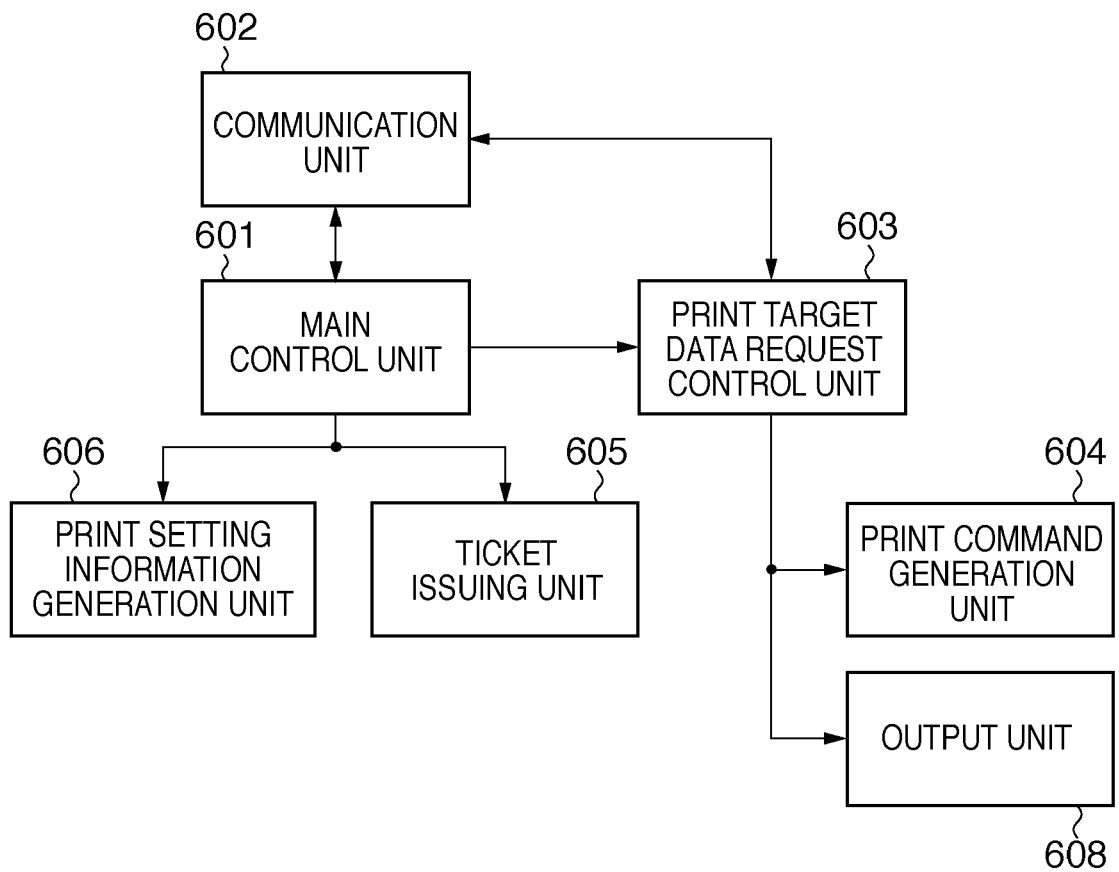
FIG. 6 is a diagram showing an example of a software configuration of the output device according to the embodiment.

FIG. 6 is a configuration diagram showing an example of software that controls the output device according to the embodiment of the present invention. Components illustrated as rectangles in FIG. 6 individually represent program components to be loaded from the mass storage device 405 into the memory 404 and executed by the CPU 400. The components are merely illustrated as being logically divided and are not necessarily divided physically.

A main control unit 601 performs overall system control of an output device system according to the embodiment of the present invention, and instructs and manages each unit that will be described later. A communication unit 602 receives a command issued by the user on the client terminal 1003 via a Web browser and transmits the command to the main control unit 601, and sends a result instructed by the main control unit 601 to the client terminal 1003 as a reply. Moreover, the communication unit 602, in response to an instruction from a print target data request control unit 603, connects to the communication unit 501 of the document management system 1001, sends a command given from the print target data request control unit 603 to the communication unit 501, and receives the result of that command and passes the received result to the print target data request control unit 603.

The print target data request control unit 603, in response to an instruction from the main control unit 601, makes a print target data request to the document management system 1001 through the communication unit 602. Moreover, the print target data request control unit 603 converts print target data that has been given as a response into a print command in a print command generation unit 604 and outputs the print command using an output unit 608. The print command generation unit 604, based on an instruction from the print target data request control unit 603, receives the print target data and converts the data into an output execution command for the output device 1002. Here, the output execution command means a printer device control code for causing the printer device 402 to perform a specific operation. At this time, the print target data request control unit 603 may simultaneously pass print setting information, in which case the print command generation unit 604 interprets the content of the print setting information and performs the conversion so as to generate an output execution command based on the designated content.

A ticket issuing unit 605, in response to an instruction from the main control unit 601, generates and passes a print ticket to the main control unit 601. Here, the print ticket means information that is dynamically generated each time a print instruction request is given and that is unique on networks including the Internet and intranets. Although the print ticket here is described as a unique character string or number such as a GUID, the print ticket may be a file containing the unique information. A print setting information generation unit 606, in response to an instruction from the main control unit 601, acquires the installation state of an option such as a finisher and the capabilities of the output device itself from the printer information management unit 403, confirms the acquired information, generates currently feasible print setting information, and reports the generated information to the main control unit 601. It is assumed that the print setting information is represented in a format such as XML or JSON. However, it does not particularly matter what the format is. The output unit 608 successively executes print commands passed from the print target data request control unit 603 for output from the, printer device 402.

Figure 7:
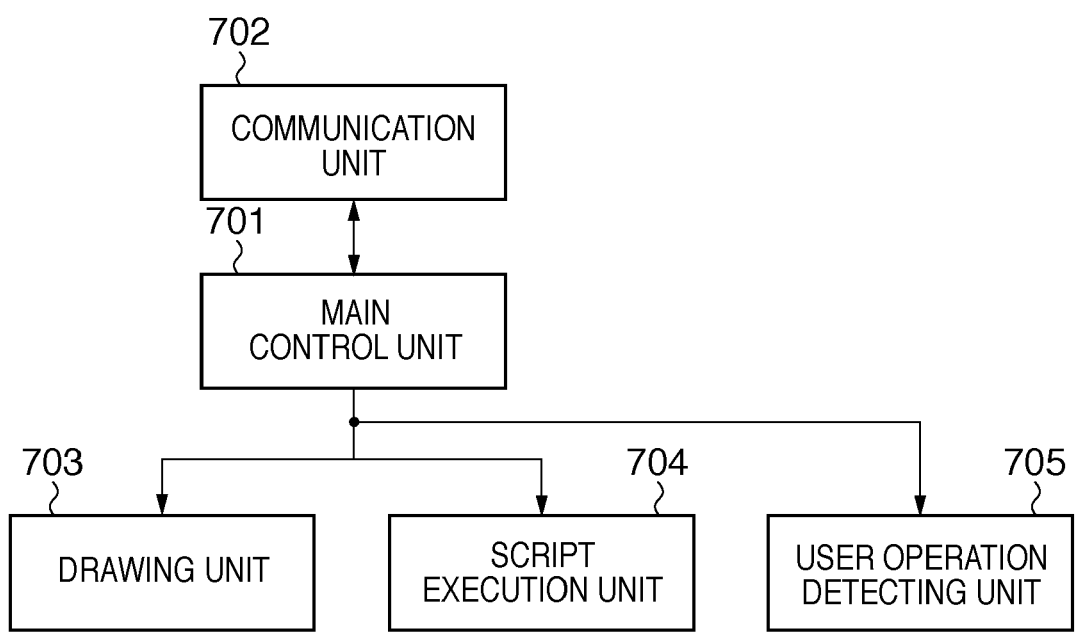
FIG. 7 is a diagram showing an example of a browser software configuration of the client terminal according to the embodiment.

FIG. 7 is a software configuration diagram of a Web browser that runs on the client terminal 1003 according to the embodiment of the present invention. Components illustrated as rectangles in FIG. 7 individually represent program components to be loaded from the external memory 309 or the program ROM 302 into the RAM 301 and executed by the CPU 300. The components are merely illustrated as being logically divided and are not necessarily divided physically.

A main control unit 701 is a unit that performs overall control of the Web browser, and calls each component and performs execution control of the component as well as exchanging data between components. A communication unit 702 sends a network request via the NC 306 based on an instruction from the main control unit 701. Moreover, the communication unit 702 receives information as a response to the sent request via the NC 306 and passes the received information to the main control unit 701.

A drawing unit 703 interprets HTML data received from the main control unit 701 and performs drawing. A script execution unit 704 interprets and executes a script received from the main control unit 701. Moreover, in the case where the executed script sends data to the outside or makes a drawing request, the script execution unit 704 requests the main control unit 701 to execute such a process. A user operation detecting unit 705 conveys an operation that the user has performed via the Web browser to the main control unit 701.

Data Structure

FIG. 9A shows an example of a data structure managed by the document management system 1001 using the user information storage unit 504, where usernames and corresponding password information are managed. FIGS. 9B and 9C show examples of data structures managed by the document management system 1001 using the document storage unit 512. FIG. 9B is a table that stores data of a document and associates a name corresponding to that document with an URI by which that document can be uniquely specified. The Web browser on the client terminal 1003 can acquire a target document by designating a URI. FIG. 9C is an access control information table that determines an access right for each user with respect to each document. For example, it is shown that with respect to a document whose DocID is "1", a user whose UserID is "1" is given both R (read) authority and W (write) authority.

FIGS. 9D and 9E show examples of data structures managed by the document management system 1001 using the print target data request storage unit 508. FIG. 9D is a table that manages a list of print target data requests currently requested from the output device 1002. FIG. 9E is a table that manages print tickets added to the print target data requests. Here, a case where the print tickets are GUIDs is shown, and print ticket data is stored in the TicketData column. Also in the case where the print tickets are file structures, print ticket data may be similarly stored in the TicketData column as binary information or may be placed in the document management system 1001 as files and paths to those files stored in the TicketData column. Moreover, FIGS. 9D and 9E are associated with each other by TicketID.

Flowchart

Figure 10A:
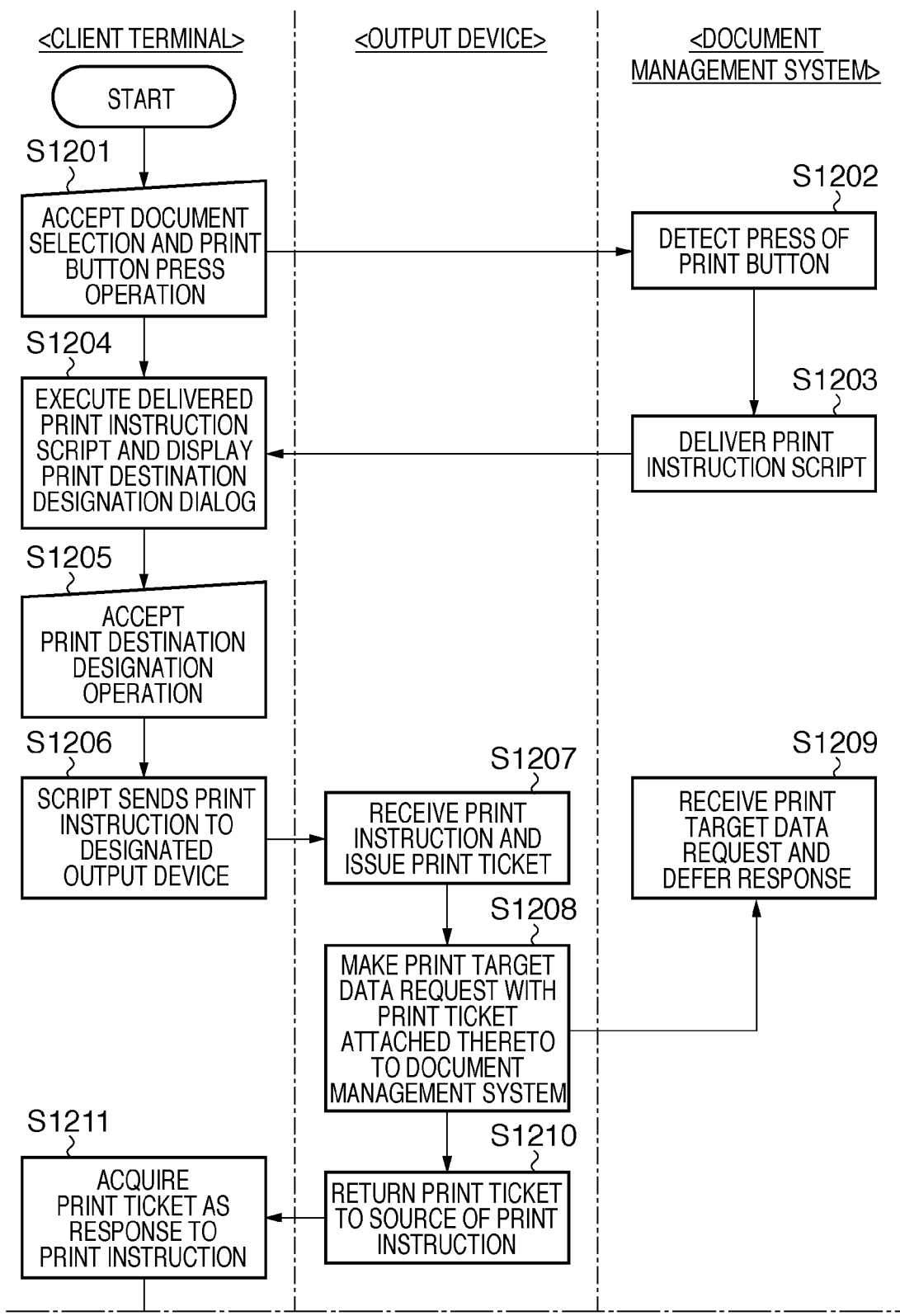

FIGS. 10A and 10B are flowcharts illustrating the flow of processing executed by the document management system 1001, the output device 1002, and the client terminal 1003. In the flowcharts of FIGS. 10A and 10B, it is assumed that processing on the document management system 1001 is performed by the CPU 300 executing the software shown in FIG. 5. Similarly, in the flowcharts of FIGS. 10A and 10B, it is assumed that processing on the output device 1002 is performed by the CPU 400 executing the software shown in FIG. 6. Also, in the flowcharts of FIGS. 10A and 10B, it is assumed that processing on the client terminal 1003 is performed by the CPU 300 executing the software of the Web browser shown in FIG. 7.

Figure 12:
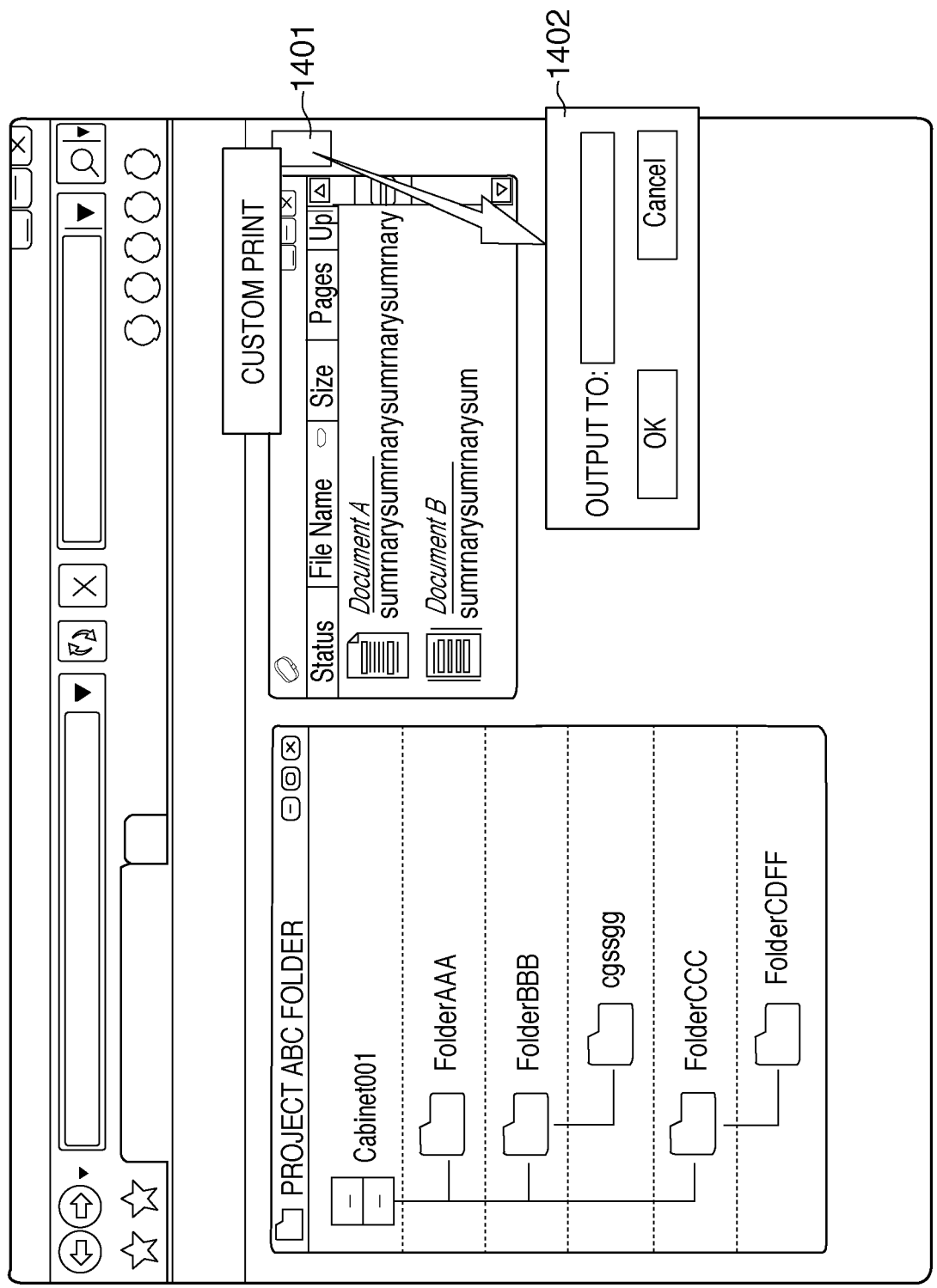
FIG. 12 illustrates an example of a printer designation dialog UI according to the embodiment.

First, FIGS. 10A and 10B show a state in which the Web browser on the client terminal 1003 is accessing the document management system 1001. Here, in step S1201, the Web browser on the client terminal 1003 accepts user operations, that is, selection of a print target document and a press of a print button, and notifies the document management system 1001 of the operations. Upon receipt of this notification, the document management system 1001 detects the press event of the print button in step S1202, and delivers a print instruction script to the client terminal in the form of a response to the event in step S1203. In step S1204, the client terminal 1003 executes the delivered print instruction script and displays a print destination designation dialog. FIG. 12 shows an example of a UI that displays the print destination designation dialog on the Web browser of the client terminal 1003, and the UI includes a print button 1401 and a print destination designation dialog 1402.

Step S1205 is a step of accepting a user operation of designating a print destination in the form of, for example, an IP address of the output device on the print destination designation dialog 1402. Although the IP address is described as an example of the method for designating the print destination, the print destination may also be designated using a network name of the output device, for example. Alternatively, the print destination may be designated in such a manner that a script that searches for and itemizes local devices is contained in the print instruction script so as to be executed before the print destination designation dialog is displayed and thus to itemize print destinations on the UI, and the print destination is selected from among the itemized print destinations.

Next, in step S1206, the print instruction script sends a print instruction to the output device designated in step S1205. It is assumed that the access destination address information of the document management system 1001 also is attached to this print instruction. The output device 1002 that has received the print instruction issues a print ticket in step S1207. The print ticket as used herein may be a unique ID character string or numerical value, such as a GUID, or may be a file format. Next, in step S1208, the output device 1002 makes a print target data request to the document management system 1001, together with the print ticket issued in step S1207 attached thereto, to the address of the document management system 1001 that has been received as the print instruction.

The document management system 1001 receives the print target data request from the output device 1002 in step S1209, but does not immediately make a response to the request at that point of time and defers the response. At this time, the document management system 1001 temporarily stores the received print target data request together with the print ticket attached thereto in the print target data request storage unit 508 in the form of data structures as shown in FIGS. 9D and 9E. The output device 1002, after making a print target data request in step S1208, returns the print ticket to the client terminal 1003, which is the source of the print instruction, in step S1210.

The client terminal 1003 acquires the print ticket as the response to the print instruction in step S1211, and in step S1212, makes a print request, together with the acquired print ticket and the URI of the document that has been selected in step S1201 attached to the print request, to the document management system 1001. Moreover, information that indicates the executing user also is attached to this print request, and so the document management system 1001 usually can determine who has made the request. In step S1213, the document management system 1001 receives the print request, and the access right determination unit 514 determines, from the attached information that indicates the executing user, whether the user has a read access right with respect to the document specified by the designated URI. In step S1221, based on the determination, if the user does not have authorized access, the processing is switched to step S1215, and if the user has authorized access, the processing is switched to step S1222.

Step S1222 is a step of searching for a print target data request corresponding to the print ticket attached to the print request. The search for the print target data request is realized by the request search unit 509 conducting a search from the print target data request storage unit 508 that is managed as shown in FIGS. 9D and 9E. In step S1214, the main control unit 502 of the document management system 1001 determines whether the request search unit 509 has found the intended print target data request. If the intended print target data request has not been found, the main control unit 502 generates and returns a print error screen to the client terminal 1003 in step S1215.

On the other hand, in step S1216, if the intended print target data request has been found, a print target data request accepting thread that has been deferring response since step S1209 receives a notification so as to send the print target document as a response. Specifically, first, the print target data request accepting thread that is currently deferring the response monitors a DocURI column of the corresponding print target data request in FIG. 9D. In this state, the corresponding document designation unit 510 writes the URI of the document attached to the print request to the DocURI column based on an instruction from the main control unit 502, whereby the print target data request accepting thread is considered to have received the notification. However, this notification method is merely an example, and the corresponding document designation unit may also send a notification of the document URI to the target data request accepting thread by issuing an event, sending a message, or other methods.

The print target data request accepting thread that has received the notification as described above retrieves the document through the document retrieving unit 511 when the document URI has been designated, and returns the document as a response to the print target data request. Thus, the print target data request accepting thread has the function of a sending unit.

In step S1217, the output device 1002 receives the document as the response to the print target data request, executes printing of this data, and notifies the document management system 1001 of the execution result in step S1218. The document management system 1001 receives the print result in step S1219 and generates and returns a print completion screen to the client terminal 1003. The client terminal 1003 receives the print completion screen as a response to the print request, and therefore draws and presents the screen to the user.

From the foregoing description, it can be said that since security for print target data in realizing the present printing system is equal to the access right set by the document management system, the security for the data is maintained. Moreover, it is shown that the present printing system can be realized without running the security risk of passing the password of the document management system to other components.

Therefore, according to the present embodiment, the function of printing a document that is protected and managed by a document management system on the Internet on an output device located within an intranet by performing operation from a Web browser can be securely realized.

Second Embodiment

In the first embodiment, the output device 1002 acquires the document designated by the client terminal 1003 and executes printing. However, it is not possible to designate print settings to execute printing. Moreover, functions of print settings that can be designated vary depending on the model and the state (whether or not an optional mechanism such as a stapling mechanism is installed) of an output device. Accordingly, it is necessary for the client terminal 1003 to receive print setting information that can be designated from the output device, but a means for achieving this is not presented.

Figure 11A:
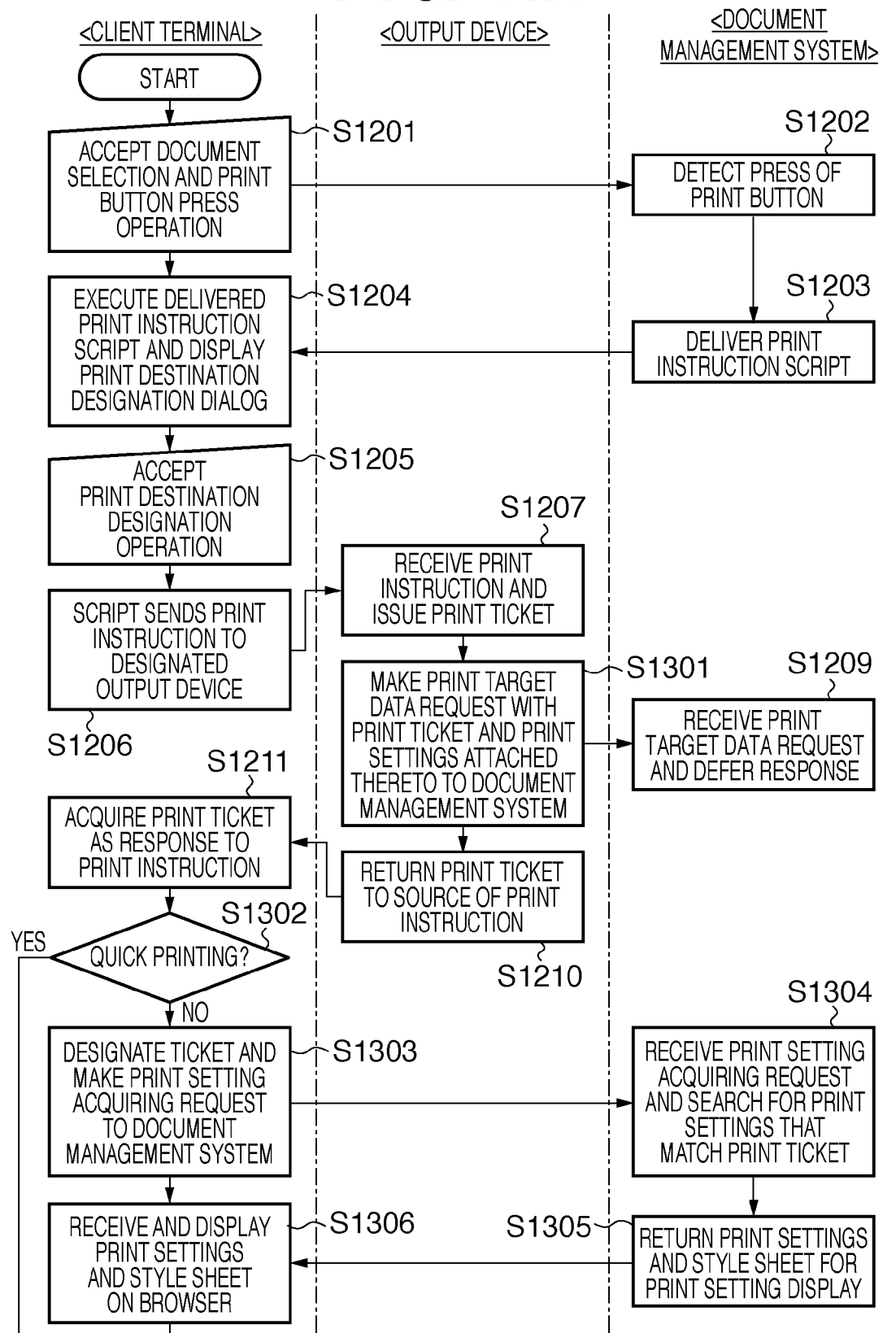
FIGS. 11A and 11B are flowcharts according to a second embodiment.
Figure 11B:
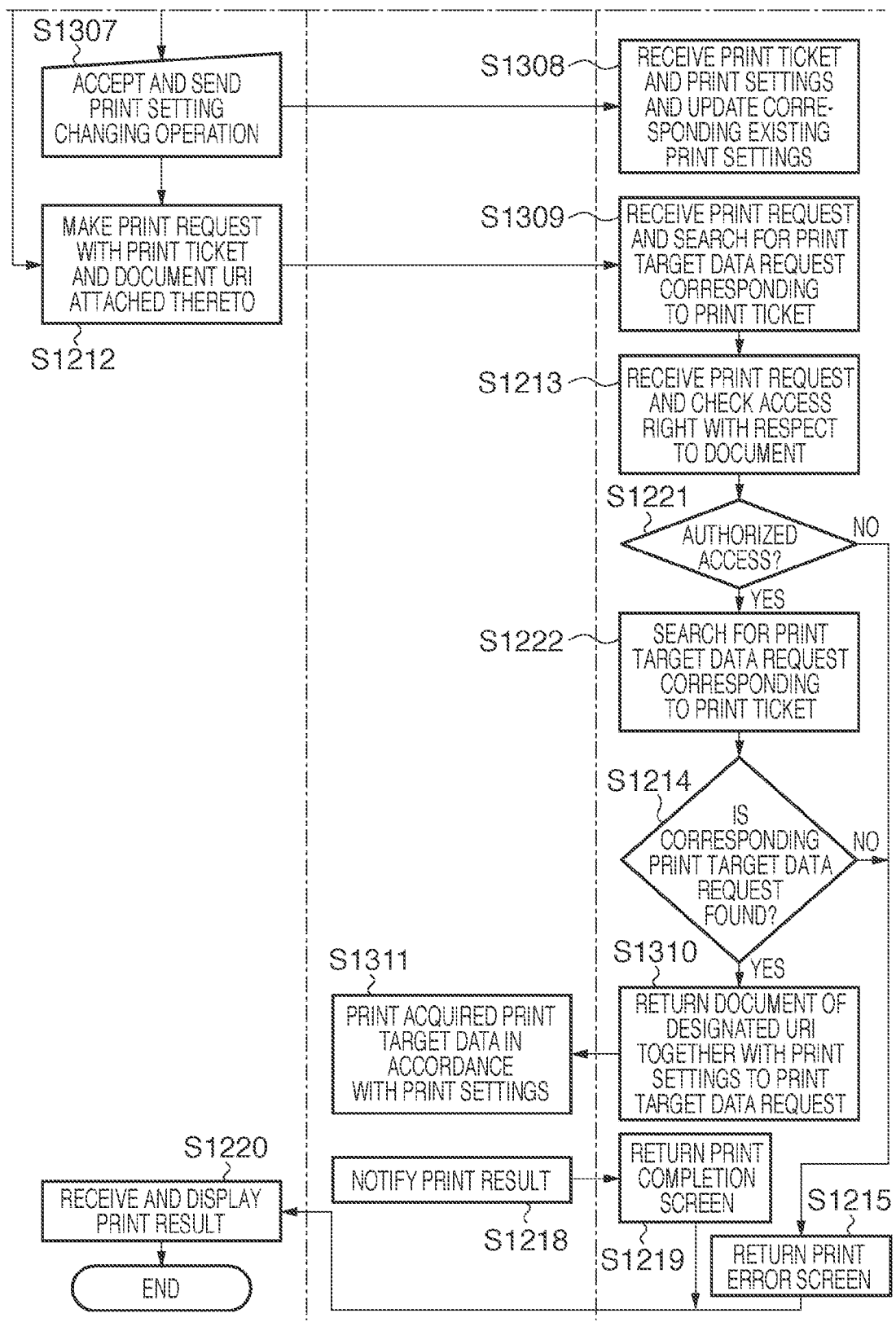

In the present embodiment, an embodiment illustrated by a flowchart shown in FIGS. 11A and 11B instead of the flowcharts (FIGS. 10A and 10B) described in the first embodiment will be described. First, in steps S1201 to S1207 in FIG. 11A, exactly the same processing as that in FIG. 10A is executed. In FIG. 10A, in step S1208, the output device 1002 subsequently makes the print target data request to the document management system 1001, together with the print ticket attached thereto, to the address of the document management system 1001. However, in FIG. 11A, in step S1301 subsequent to step S1207, the output device 1002 makes the print target data request to the document management system 1001, together with not only the print ticket but also print setting information attached thereto, to the address of the document management system 1001.

Here, the print setting information is data that the output device 1002 generates using the print setting information generation unit 606 by determining the functions of the output device itself, the installation state of an option, and the like and in which print settings that can be set in the output device 1002 are collected. FIG. 8 is an example of the print setting information, which is represented in the XML format. However, the form of data representation is not limited to XML, and other formats such as JSON and CSV can also be used.

In this example, the paper size (PaperSize), the number of pages to be printed on a single piece of paper (NumberOfPageOnPaper), and the color mode (ColorMode) can be designated. Moreover, each setting is defined by an XML element, current settings are indicated as value attributes, and choices are itemized as sub-elements. For example, the paper size can be selected from among A4/A3/A5, and it is indicated that "A4" is currently designated. Moreover, the number of pages to be printed on a single piece of paper can be selected from 1/2/4/8, and "2" is currently designated, setting that two pages of data are to be printed on a single piece of paper. Furthermore, with respect to the color mode, either color or black and white can be selected, and color printing is currently set.

After execution of step S1301, the same processing as in FIG. 10A is executed from step S1209 until step S1211. After step S1211, in FIG. 11A, step S1302 is executed, and the print instruction script displays a dialog that prompts the user to select whether to execute "quick printing", and accepts a Yes/No input. "Quick printing" as used herein means that printing is performed without changing the print settings. If the user selects "Yes", the processing proceeds to step S1212 as in FIG. 10B, but if the user selects "No", the print instruction script executes a print setting acquiring request to which the print ticket is attached to the document management system 1001.

The document management system 1001 receives the print setting acquiring request and searches for print settings that match the attached print ticket in step S1304. The method for searching for print settings is the same as that in step S1213, in which the request search unit 509 first searches for a print target data request that matches the attached print ticket and then acquires attached print setting information from that print target data request. In step S1305, the document management system 1001 returns the print setting information and a style sheet for print setting display. Here, the style sheet for print setting display is style information data that formats the print setting information as shown in FIG. 8 into a form that can be displayed on a Web browser. For example, in the case where the print setting information is represented in XML as shown in FIG. 8, the style sheet for print setting display is usually represented in XSLT. Moreover, a script such as a JavaScript (registered trademark) may also be contained so that the Web browser can detect a change in the print settings.

The client terminal 1003 receives and displays the print setting information and the style sheet on the browser in step S1306. Moreover, in step S1307, the client terminal 1003 accepts a print setting changing operation by the user, adds the print ticket to the changed print setting information, and sends the information to the document management system 1001. The document management system 1001 that has received the changed print setting information in step S1308 uses the attached print ticket to search for print setting information currently held in the print target data request storage unit by performing the same operation as in step S1304. Here, the document management system 1001 updates the current print setting information kept in the print target data request storage unit with the changed print setting information. On the other hand, after sending the changed print setting information, the client terminal 1003 executes step S1212 in the same manner as in FIG. 10B. Then, in step S1309, the document management system 1001 receives the print request that has been sent in step S1212 and searches for a print target data request corresponding to the print ticket. Afterward, steps S1213 to S1214 also are executed in the same manner as in FIG. 10B.

In step S1310, a thread for deferring response to the print target data request returns the document specified by the designated URI to the output device 1002 as a response in the same manner as in step S1215 in FIG. 10B. However, at this time, the print setting information also is added to the response. In step S1311, the output device 1002 receives the print target data and the print setting information and executes print processing in accordance with the print setting information added to the received print target data. Subsequent steps S1218 to S1220 are the same as those in FIG. 10B.

According to the present embodiment, when a document that is managed on the Internet outside a firewall is to be output on an output device located within an intranet, it is possible to make print settings appropriate for the model and the state of the output device before outputting the document.

Third Embodiment

In the second embodiment, the output device 1002 acquires the document designated by the client terminal 1003 and executes printing. However, the document formats with respect to which the output device 1002 can perform print processing are limited and may be different from the format that is managed by the document management system 1001.

Figure 13A:
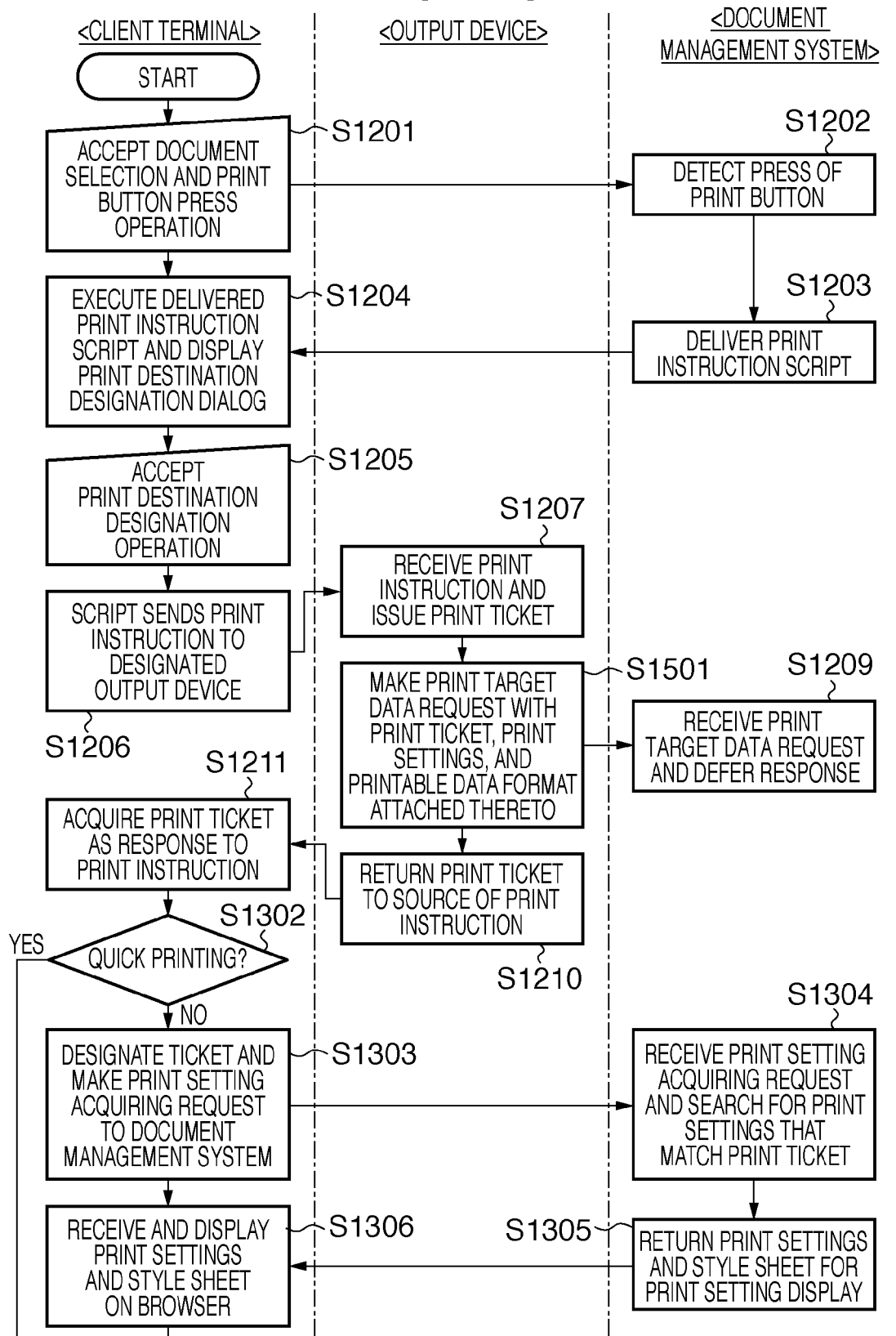
FIGS. 13A and 13B are flowcharts according to a third embodiment.
Figure 13B:
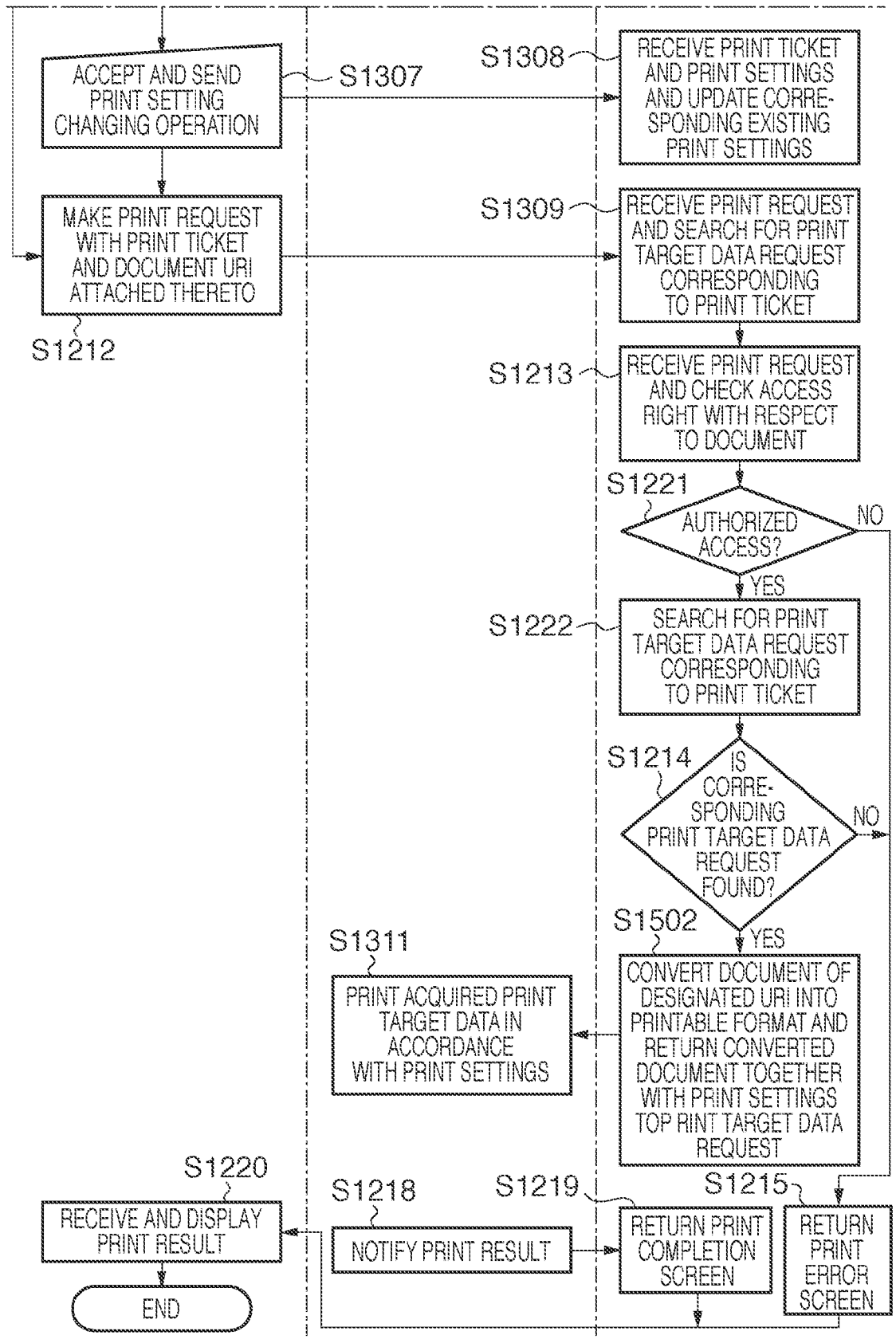

In the present embodiment, an embodiment illustrated by flowcharts shown in FIGS. 13A and 13B instead of the flowcharts (FIGS. 11A and 11B) described in the second embodiment will be described. First, in steps S1201 to S1207 in FIG. 13A, the same processing as that in FIGS. 10 and 11 is executed. After execution of step S1207, the output device 1002 makes a print target data request, together with a print ticket, print setting information, and data format information indicating a data format that can be output by the output device added to the print target data request, to the document management system 1001 in step S1501. Here, the data format information indicating the data format that can be output is represented by a character string (e.g., "PDF", "XPS", or the like) whereby the output device 1002 can specify a printable format. Afterward, in steps S1209 to S1214, the same processing as the processing shown in FIGS. 11A and 11B is executed.

If the corresponding print target data request is found in step S1214, the document management system 1001 returns the print target data and the print setting information as a response to the print target data request in step S1502. At this time, the document conversion unit 513 converts the document specified by the target URI into the format printable by the output device 1002 in accordance with the printable format information received in step S1501. In step S1502, the document management system 1001 returns this converted data as the print target data.

According to the present embodiment, even in the case where a document that is managed on the Internet outside a firewall is not kept in a data format processable by a designated output device, it is possible to output the document on the designated output device.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298827, filed Dec. 28, 2009, which is hereby incorporated by reference herein in its entirety.

The invention claimed is:

1. A printing system comprising a client terminal, a data management system, and an output device, which can communicate with one another when communication is initiated by the client terminal or the output device,
the output device comprising:
a ticket issuing unit configured to issue a print ticket associated with a print instruction;
a print target data request control unit configured to make a print target data request with the print ticket attached thereto to the data management system; and
an output unit configured to output print target data acquired from the data management system as a response to the print target data request, and
the data management system comprising:
a data storage unit configured to keep data;
a script generation unit configured to generate a script to be executed by the client terminal to allow a user to input the print instruction;
a request management unit configured to accept the print target data request from the output device, temporally to defer the response to the print target data request, and to perform control so that the response to the print target data request is made after print target data designation;
a user authentication unit configured to specify the user;
an access right determination unit configured to determine an access right of the user with respect to the kept data;
a request search unit configured to search for a print target data request corresponding to the print ticket attached to a print request from the client terminal from among print target data requests with respect to which a response has been deferred;

a corresponding document designation unit configured to, in the case where the access right determination unit performs access right determination with respect to data designated by the print request and determines that access is permitted, designate the data designated by the print request as print target data requested by the corresponding print target data request; and a sending unit configured to send the print target data designated by the corresponding document designation unit to the output device as the response to the print target data request, wherein the script generated by the data management system is executed by the client terminal and sends the print instruction to an output device designated by the user, and sends the print ticket issued by the output device together with information indicating data to be printed to the data management system as the print request.

2. The printing system according to claim 1, wherein the print target data request control unit of the output device further attaches print setting information to the print target data request, the output device further comprises a print command generation unit configured to generate a print command in accordance with the print setting information attached to the response to the print target data request from the print target data request control unit, the data management system further comprises a print target data request storage unit configured to store the print target data request, and wherein the request management unit updates the print setting information that is a part of the print target data request based on the print ticket.

3. The printing system according to claim 2, wherein the print target data request control unit of the output device further attaches data format information indicating a data format printable by the output device to the print target data request, and the data management system further comprises a document conversion unit configured to perform conversion into the data format printable by the output device based on the data format information.

4. A data management system that is connected to a client terminal and an output device, comprising:

a data storage unit configured to keep data;

a script generation unit configured to generate a script to be executed by the client terminal to allow a user to input a print instruction;

a request management unit configured to accept a print target data request from the output device, temporally to defer a response to the print target data request, and to perform control so that the response to the print target data request is made after print target data designation;

a user authentication unit configured to specify the user;

an access right determination unit configured to determine an access right of the user with respect to the kept data;

a request search unit configured to search for a print target data request corresponding to a print ticket attached to a print request from the client terminal from among print target data requests with respect to which a response has been deferred;

a corresponding document designation means unit configured to, in the case where the access right determination unit performs access right determination with respect to data designated by the print request and determines that access is permitted, designate the data designated by the print request as print target data requested by the corresponding print target data request; and a sending unit configured to send the print target data designated by the corresponding document designation unit to the output device as the response to the print target data request.

5. A method for controlling a printing system comprising a client terminal, a data management system, and an output device, which can communicate with one another when communication is initiated by the client terminal or the output device, the method comprising the steps of:

in the output device, issuing a print ticket associated with a print instruction;

making a print target data request with the print ticket attached thereto to the data management system; and outputting print target data acquired from the data management system as a response to the print target data request, and in the data management system, keeping data;

generating a script to be executed by the client terminal to allow a user to input the print instruction;

accepting the print target data request from the output device, temporally to defer the response to the print target data request, and performing control so that the response to the print target data request is made after print target data designation;

specifying the user;

determining an access right of the user with respect to the kept data;

searching for a print target data request corresponding to the print ticket attached to a print request from the client terminal from among print target data requests with respect to which a response has been deferred;

in the case where access right determination with respect to data designated by the print request is performed in the access right determination step and it is determined that access is permitted, designating the data designated by the print request as print target data requested by the corresponding print target data request; and sending the print target data designated in the corresponding document designation step to the output device as the response to the print target data request, wherein the script generated by the data management system is executed by the client terminal and sends the print instruction to an output device designated by the user, and sends the print ticket issued by the output device together with information indicating data to be printed to the data management system as the print request.

6. A non-transitory computer-readable storage medium storing a computer program for causing a computer to function as:

a data storage means unit configured to keep data;

a script generation means unit configured to generate a script to be executed by a client terminal to allow a user to input a print instruction;

a request management means unit configured to accept a print target data request from an output device, temporally to defer a response to the print target data request, and to perform control so that the response to the print target data request is made after print target data designation;

a user authentication means unit configured to specify the user;

an access right determination means unit configured to determine an access right of the user with respect to the kept data;
a request search means unit configured to search for a print target data request corresponding to a print ticket attached to a print request from the client terminal from among print target data requests with respect to which a response has been deferred;
a corresponding document designation means unit configured to, in the case where the access right determination means unit performs access right determination with respect to data designated by the print request and determines that access is permitted, designate the data designated by the print request as print target data requested by the corresponding print target data request; and
a sending means unit configured to send the print target data designated by the corresponding document designation means unit to the output device as the response to the print target data request.

* * * * *